United States Patent [19]

Beausoleil et al.

[11] Patent Number: 5,109,496
[45] Date of Patent: Apr. 28, 1992

[54] MOST RECENTLY USED ADDRESS TRANSLATION SYSTEM WITH LEAST RECENTLY USED (LRU) REPLACEMENT

[75] Inventors: William F. Beausoleil, Hopewell Junction; Tak-Kwong Ng, Hyde Park, both of N.Y.

[73] Assignee: International Business Machines Corporation, Armonk, N.Y.

[21] Appl. No.: 413,408

[22] Filed: Sep. 27, 1989

[51] Int. Cl.$^5$ .................. G06F 12/02; G06F 12/10; G06F 12/12
[52] U.S. Cl. .................. 395/400; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 3,737,881 | 6/1973 | Cordi et al. | 364/200 |
| 3,781,808 | 12/1973 | Ahearn et al. | 364/200 |
| 3,806,883 | 4/1974 | Weisbecker | 364/200 |
| 3,902,163 | 8/1975 | Amdahl et al. | 364/200 |
| 3,964,028 | 6/1976 | Belady et al. | 364/200 |
| 4,008,460 | 2/1977 | Bryant et al. | 364/200 |
| 4,168,541 | 9/1979 | DeKarske | 364/200 |
| 4,322,795 | 3/1982 | Lange et al. | 364/200 |
| 4,376,297 | 3/1983 | Anderson et al. | 364/200 |
| 4,422,145 | 12/1983 | Sacco et al. | 364/300 |
| 4,463,420 | 7/1984 | Fletcher | 364/200 |
| 4,463,424 | 7/1984 | Mattson et al. | 364/300 |
| 4,525,778 | 6/1985 | Cane | 364/200 |
| 4,783,735 | 11/1988 | Miu et al. | 364/200 |

Primary Examiner—Joseph A. Popek
Assistant Examiner—Michael A. Whitfield
Attorney, Agent, or Firm—Robert L. Troike

[57] ABSTRACT

A least recently used associative map is described for translating virtual memory addresses to real memory addresses. The map includes a stack of storage devices each with a comparator. The storage devices are arranged in a push down stack with an input storage device to receive the incoming virtual address and store the corresponding real address and the other storage devices coupled to the output of the previous higher storage devices and with storage devices storing the translation of virtual address and real address in order of recent use with the last or bottom storage device storing the least recently used device. When the comparator detects a compare that real address is provided out and that translation is applied to the input storage device as the most recently used translation and the other translations are shifted down the stack to replace in the storage device that had the compare with the translation from the previous storage device. If there is not a compare a new translation is entered at the input storage device and the other translations are shifted down with the least recently used being shifted out if all the storage devices are full.

10 Claims, 6 Drawing Sheets

MOST RECENTLY USED ADDRESS TRANSLATION SYSTEM WITH LEAST RECENTLY USED (LRU) REPLACEMENT

This invention relates to an associative map with a least recently used (LRU) entry replacement where the least recently used data in the map is removed, and more particularly, to an address translation system using an associative map storing virtual addresses and corresponding real memory addresses.

A computer system having a limited main memory capacity can expand that capacity by storing lesser used programs and data into disks or drum memory. Information in this auxiliary storage is divided into segments and each segment is further subdivided into pages. Pages of instructions and data are often then moved from the auxiliary storage into the main memory as needed by the execution process. As pages are stored in the main memory, their real addresses are entered into a system of directories. Using these directories the programmer written virtual addresses are converted to real addresses before each memory fetch or store operation. A dynamic address translation (DAT) unit converts the virtual memory addresses into real memory addresses when the data is present in the main memory. Virtual addresses are more rapidly translated into real addresses by storing a limited number of real addresses (which correspond to previously translated logical addresses) in a partitioned Translation Lookaside Buffer (TLB) in which each partition is associated with a recently active user process. This unit for translation of the virtual address to the real address is affected by referring to a translation table in the storage, which table comprises to a segment table and a page table. The segment table is referred to by a sum of a first address of a segment table (hereinafter referred to as a Segment Table Origin address or STO address) and a segment index portion of a virtual address. This entry includes a preset first address of the page table (hereinafter referred to as a Page Table Origin address or PTO address), and any entry of the page table which is a sum of the PTO address and a page index portion of the virtual address is referred to. This latter entry includes a preset real address, which is linked to a byte index to determine the real address. A Translation Lookaside Buffer (TLB) with LRU replacement policy stores the virtual address and the corresponding real address of the most frequently used addresses to provide quick translations for the most commonly used.

Figure 1:
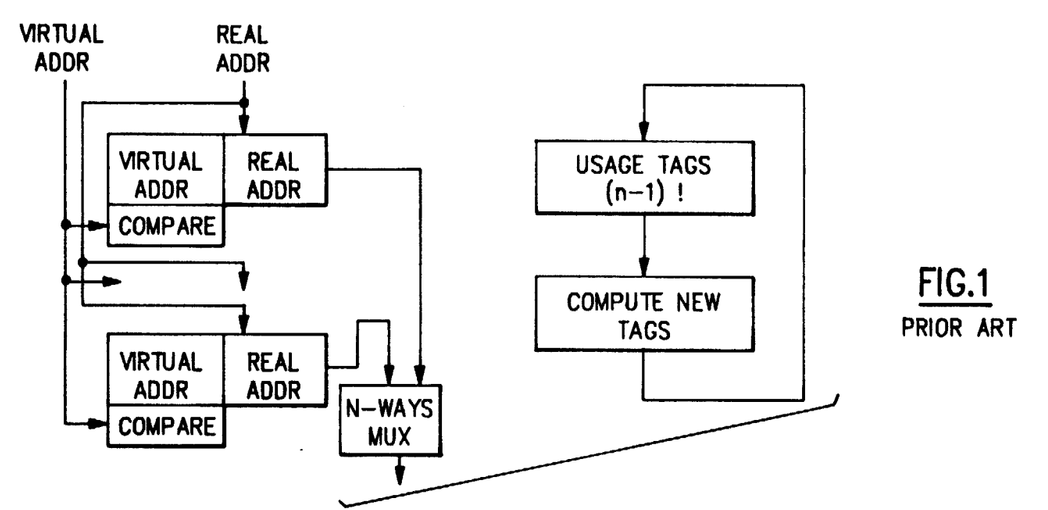
FIG. 1 illustrates an N-ways associative translation lookaside buffer according to the prior art.

FIG. 1 shows a prior art method of achieving this table by the use of N-way associative table where the virtual addresses are compared to those stored in the table to provide a real address translated output for those in the table via an N-way multiplexer where there is a compare or hit. Obviously, any such table is limited and there is a requirement to provide some way of eliminating or rejecting the least recently used addresses to make room for new addresses. In an N-way associative array there must be some way of determining the most recently used translation. This is provided by tags where the tags are associated with each table entry and those least frequently used are kicked out of the table. This requires computing new tags as indicated by the flow diagram of FIG. 1 at the right. Virtual storage systems are discussed in U.S. Pat. No. 3,902,163 entitled, "Buffered Virtual Storage and Data Processing System" by Gene M. Amdahl et al. and, U.S. Pat. No. 3,781,808 entitled, "Virtual Memory System" by Thomas P. Ahearn et al.

This N-way associative approach is not flexible in that the size of the buffer is restricted to powers of 2 and requires the separate registers for keeping track of the usage of the registers or buffers. It is not easily expanded and it is not easily able to handle a defective buffer.

In accordance with the present invention, the table is arranged in a unique last recently (LRU) entry replacement stack. U.S. Pat. No. 4,008,460 entitled, "Circuit for Implementing a Modified LRU Replacement Algorithm for a Cache" of Bryant et al., assigned to International Business Machines Corporation, assignee of the present invention, discloses a push down stack may be used to track address usage in column one of the patent. U.S. Pat. No. 4,376,297 entitled, "Virtual Memory Addressing Device" of Anderson et al. and U.S. Pat. No. 4,322,795 of Lang et al. disclose memory addressing systems which use a least recently used (LRU) scheme and a stack.

A stack is defined in "The Art of Computer Programming Volume 1/Fundamental Algorithms, 2nd edition" by Donald E. Knuth defined a stack on page 235, as "a linear list for which all insertions and deletions (and usually all accesses) are made at one end of the list." On page 234 it defines a linear list as "a set of $N > = 0$ nodes ... whose structural properties essentially involve only the linear (one dimensional) relative positions of the nodes ... ". As further stated in a book entitled "Computer Organization" by Hamacher, Vranesic and Zaky, 1984 McGraw Hill Publishing Company, a "pushdown stack is a list of data elements, usually words or bytes, with the accessing restriction that must be added or removed at one end of the list only. This end is usually called top of the stack, with the other end being called the bottom. The term pushdown is motivated by the analogy with a pile of trays in a cafeteria. Customers pick up new trays from the top of the pile, and clean trays are added to the pile by pushing them onto the top of the pile. Another descriptive phrase, 'last in, first out' is also used to describe this type of storage mechanism, leading to the abbreviation LIFO stack. Clearly, the last item placed on the stack is the first one removed when retrieval begins." The placing of a new item on the stack causes the pushing down, decrementing the stack pointer to point to the new top of the stack. The pointer contains the address of the current top element. The removal of an item on the stack is referred to as to pop an item from the top of the stack. Conventional push down stacks as represented by the known prior art are not practical for least recently used replacement table for address translation.

SUMMARY OF THE INVENTION

In accordance with the present invention, an associative map for translating input data from an external source into translated data includes a plurality of storage devices each adapted to store first data and corresponding translated data where these storage devices are stacked in an order with a first storage device at one input end receiving said input data to the stack and to store the most recently used translation of first data. The other storage devices are stacked in order with their input being the output from the previous storage device and with the last storage device furthest from the first device containing the first data and translated data that is the least frequently used. Each of the storage devices includes comparator means for comparing the input data to the first data for if there is no compare providing the input data and its corresponding translated data to said first device and shifting down of the other translations from storage device to storage device and the shifting out of the system the least recently used translation. If there is a compare providing the corresponding translated data out of the system as a translation and providing that input data and translated data to the first storage device as the most recently used translation. There is further shifting down of all translations from the storage devices prior to said storage device having the compare to move the first data and translated data from the previous storage device to said storage device having the compare.

DESCRIPTION OF ONE EMBODIMENT OF THE PRESENT INVENTION

Referring to FIG. 1 there is illustrated an N-way associative map or table in accordance with the prior art. The virtual addresses are compared to those stored in the table to provide a real address translated output for those tables via an N-way multiplexer shown when there is a compare or hit. As mentioned previously, this table is limited and there is a requirement to provide some way of eliminating or rejecting the least recently used addresses to make room for new addresses. As shown in the flow diagram to the right of FIG. 1, this requires an addition structure for keeping track of the usage tags. The subject invention is an improvement in an associative map which does not require the separate tags for keeping track of usage of translations and further, is more easily expanded and able to correct for bad storage devices. An application for an associative map is the storing of translation of the virtual page addresses to real page addresses in a virtual memory computing system.

Figure 2:
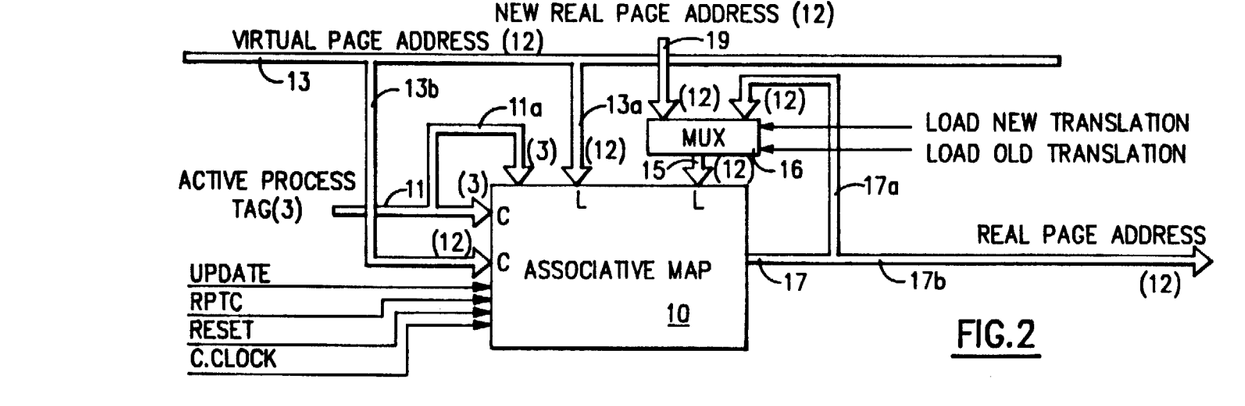
FIG. 2 is a diagram illustrating the inputs to an associative map according to one of embodiment of the present invention.

FIG. 2 shows the associative map 10 and its inputs and outputs. The inputs to the associative map include active process tag, virtual page address and new real page address. The active process tag refers to a STO number which identifies which segment table the address is associated with. A process tag 0 is reserved to signify a null entry. The active process tag on bus 11 is three bits allowing for seven tables, for example. This tag as applied to a "C" or compare input of the associative map 10. The active process tag is also applied to one of the "L" or latched inputs of the associative map via bus 11a.

The active virtual page address on bus 13 is also applied to one of the compare inputs or "C" inputs (via bus 13b) of the associative map 10 and one of the "L" inputs (via bus 13a) to the latched input or "L" input of map 10. The remaining L-input to the associative map is a new real page address applied via bus 15. This real page address would be either the real address from the output of the associative map 10 via bus 17, or a new real page address from the main memory via bus 19. The control at multiplexer 16 for which of the two would be dependent upon a signal from loads control which would either identify a new translation or an old translation.

Figure 3:
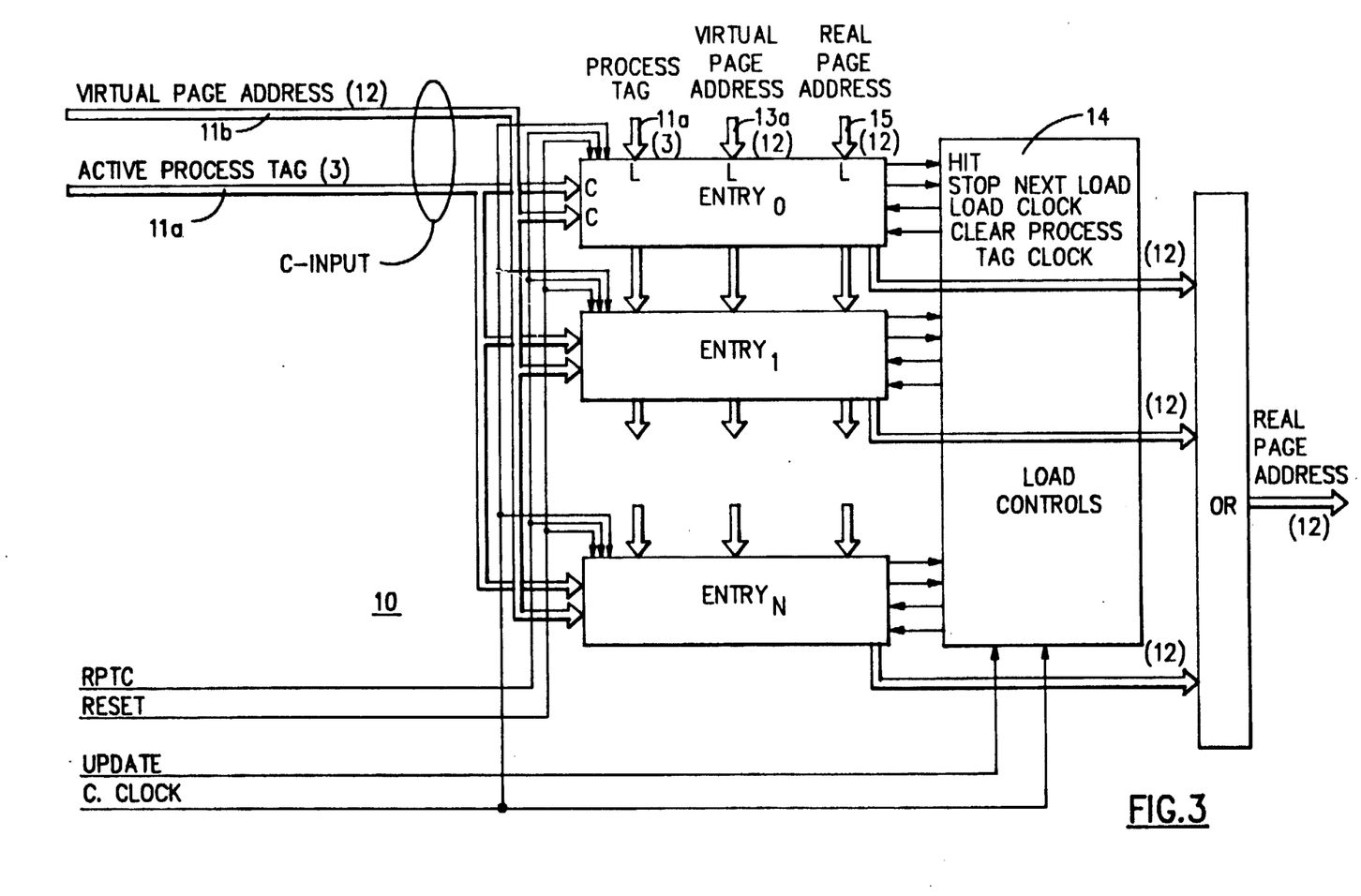
FIG. 3 is a system block diagram of the associative map in FIG. 2 illustrating the stack of storage registers and the addressing applied thereto and the load controls indicated generally.

Referring to FIG. 3 there is illustrated a block diagram of the associative map 10 in more detail. The associative map 10 includes a stack of storage devices including registers and combinatorial logic $Entry_0$ through $Entry_n$. Each of the registers may be a series of flip-flop stages with one flip-flop stage for each bit. Each of these entry storage devices have the C- and L-inputs with the active process tags and active virtual page address applied to the C-inputs of all $Entry_0$ through $Entry_n$ storage devices and with the active process tags and active virtual addresses on the buses 11 and 13 also applied via 11a and 13a to the L-inputs of the first storage device $Entry_0$.

The real page address from either a new translation set or an old translation from a "hit" or compare is applied at the bus 15 as discussed previously. The load controls are provided from block 14. When the load clock from the load controls 14 is applied to the storage devices $Entry_0$ through $Entry_n$ the translation set of virtual addresses and real addresses stored in storage device $Entry_0$ are transferred to storage device $Entry_1$, the translation set in storage device $Entry_1$ is transferred to storage device $Entry_2$ etc. with the set $Entry_{n-1}$ applied in its output to $Entry_n$. The translation in $Entry_n$, when all the other entries are filled, discards that translation out of the map as a least recently used translation. As stated previously, the L-inputs of input storage device $Entry_0$ are the active process tag, the virtual page address, and the corresponding real address. The C-inputs of all entries are the active process tag and the virtual page address. Each $Entry_0$ through $Entry_n$ has two sets of outputs, the L-outputs and the R-outputs. As stated previously, the L-outputs are wired to the L-inputs of the next entry. An entry is a hit when its stored process tag and virtual page address match the C-inputs. The R-outputs are all zeros when the entry is not a hit. Otherwise, the R-outputs are the real page address stored in the storage device. The loading of each storage device register $Entry_0$ through $Entry_n$ is controlled by the load control, and more particularly by the load clock as indicated previously. The load controls receive both the "Update" and the "C clock" signals. Each storage device receives a C clock, a reset signal, an RPTC signal, as well as the active process tags and virtual page address tags.

Figure 4:
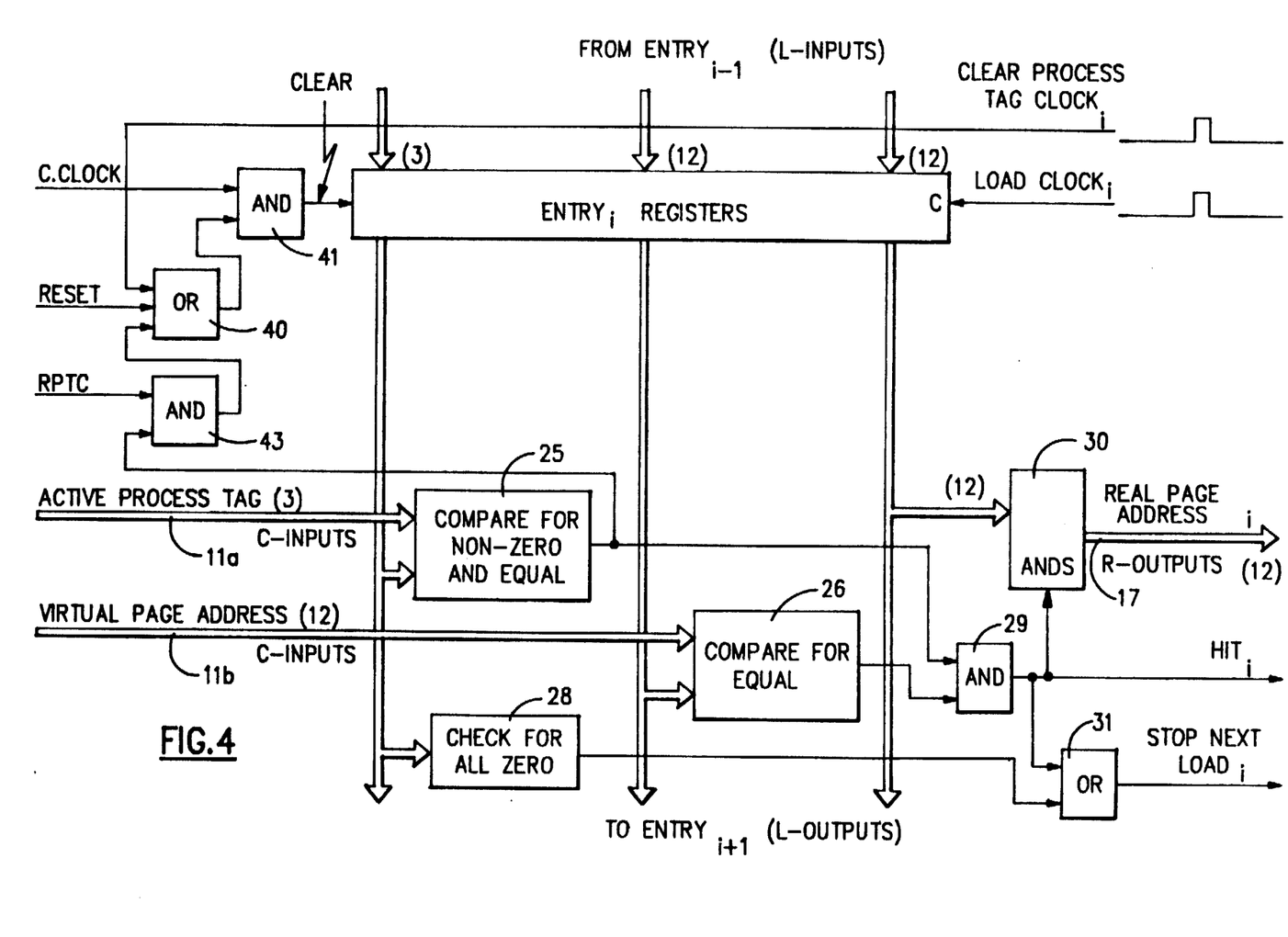
FIG. 4 is a block diagram of a given storage register.

Referring to FIG. 4, there is illustrated a block diagram of an $Entry_i$ which is any one of the storage device registers $Entry_0$ through $Entry_n$. The $Entry_i$ receives the output from the previous storage device as represented by $Entry_{i-1}$ or in the case of the top $Entry_0$ the active virtual (and real address translation when available) at its L-input and receives at comparators 25 and 26 at C-inputs the active process tag and virtual page address. The presence of the load clock loads the Entry$_i$ from the input and that entry is then compared with the active process tag at comparators 25 and 26. Also a check for process tags of all 0's is had at comparator 28. If there is a non-zero and a compare at the active process tag compare 25 and there is a compare of the virtual addresses at comparator 26 AND gate 29 is enabled to provide a "hit" or compare signal at Entry$_i$. With a hit at Entry$_i$ the real address of Entry$_i$ is enabled via AND gate 30 to the output bus 17 to apply to the output the real page address indicated on bus line 17$b$ and also to the input of the map 10 as indicated via bus 17$a$ to multiplexer 16 and to bus 15 as shown in FIGS. 2 and 3. This then places the real address of the latest hit to the top of the stack at the Entry$_0$ in FIG. 3. As can be seen in FIG. 4 the hit also produces a stop next load signal via OR gate 31. The stop next load signal is also generated when the Entry$_i$ is a null as detected by the check for all zero device comparator 28. When the stop next load$_i$ is active then for the next update signal for updating the registers, when a load clock is applied all entries after Entry$_i$ need not be changed.

Figure 5:
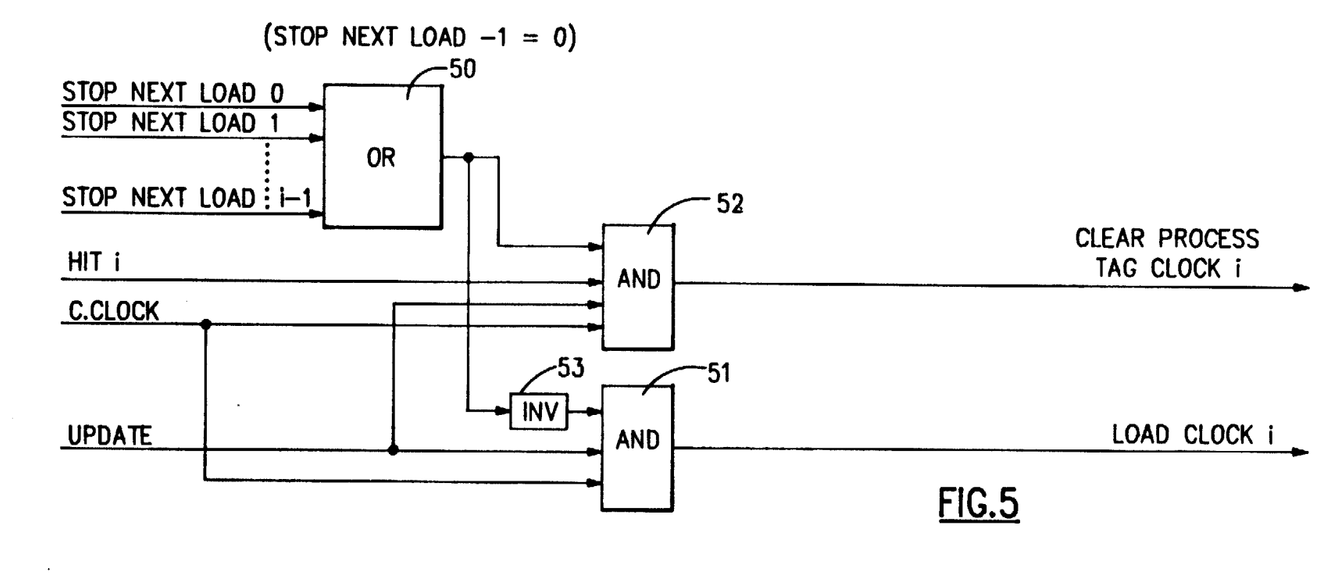
FIG. 5 is a diagram of the load controls for that register illustrated in FIG. 4.

The load control's logic is shown in FIG. 5. Entry$_i$ is nullified when a clear process tag clock$_i$ signal is active. The clear process tag clock signal from the logic 14 is provided through OR gate 40 to AND gate 41 such that when a C clock clears signal occurs AND gate 41 provides a clear signal to the Entry$_i$ nullifying the data in Entry$_i$. This clear process tag clock$_i$ will be active when both the update signal and the C clock signal are active and it is not necessary to shift in any Entry$_{i-1}$ and Entry$_i$ is a hit as indicated by AND gate 52. Entry$_{i-1}$ is loaded into Entry$_i$ when the load clock$_i$ signal is active. This load clock signal is active when both the C clock signal and "update" signal are active, and all previous entries are valid and none of the entries are a hit.

Referring to FIG. 5 the load control for the first storage device Entry$_0$ does not contain the inputs to the OR gate 50 therein and therefore, a clear process tag is not sent to the OR gate 40 for the first storage device Entry$_0$ in FIG. 4 and the input from the "update" and C clocks in the new input enable the AND gate 51 to produce the load clock$_0$. For the other storage devices Entry$_1$ through Entry$_n$ the AND gate 52 has in addition to the hit$_i$ input, C clock input and "update" input the requirement for the input from OR gate 50. The OR gate 50 receives a stop next load from the previous storage devices Entry$_0$ through Entry$_i$. As stated previously, a stop next load for a given storage device Entry$_i$ is sent when there is a hit in that device or that storage device Entry$_i$ is null as indicated by a check for all 0's. If the load control for that particular entry indicates this stop next load condition for its previous storage devices as indicated by stop next entry load 0 through stop next load$_{i-1}$, an enabling signal is provided to AND gate 52 to provide a clear "process tag clock$_i$" signal to that particular Entry$_i$ storage device. Also this indication of an invalid entry in the previous stage not only provides a clear but will also prevent via an inverter 53 a load clock signal for loading a null entry.

There is also a "reset" signal supplied to each Entry$_0$ through Entry$_n$ and via OR gate 40 as shown in FIG. 4. This signal enables clearing all translation in the map 10. It can be used when starting a new translation when there are new programs. There is also provided a signal in control called "reset process tag compared" (RPTC) supplied to each entry as indicated in FIG. 4 at AND gate 43. When this signal is applied the entries with process tags that match the active process tags at comparator 25 are nullified. This is done by the output from the compare 25 also being applied to the AND gate 43.

Figure 6A:
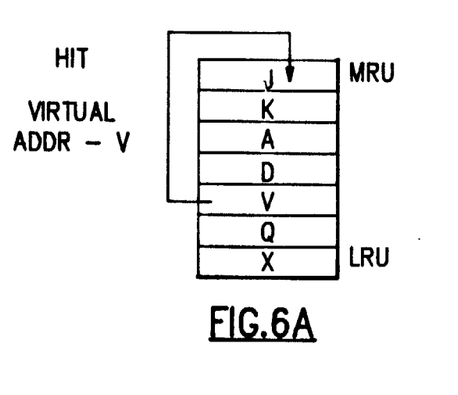
FIGS. 6A, 6B, 7A, 7B, 8A and 8B are diagrams useful for illustrating the operation of the associative map.
Figure 6B:
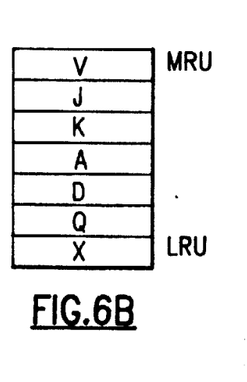
Figure 7A:
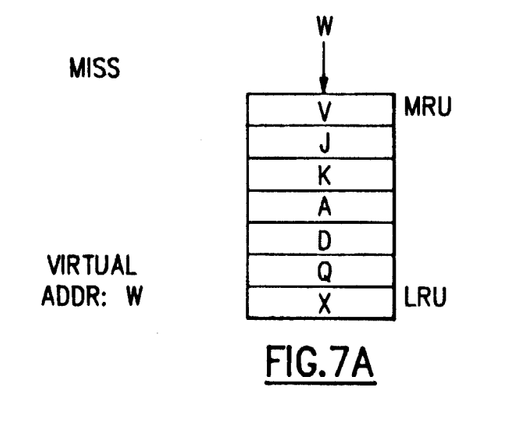
Figure 7B:
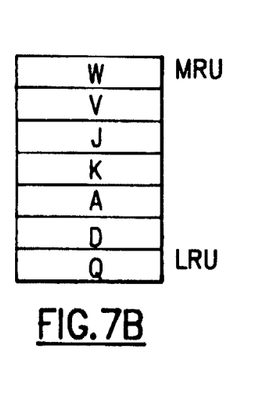
Figure 8A:
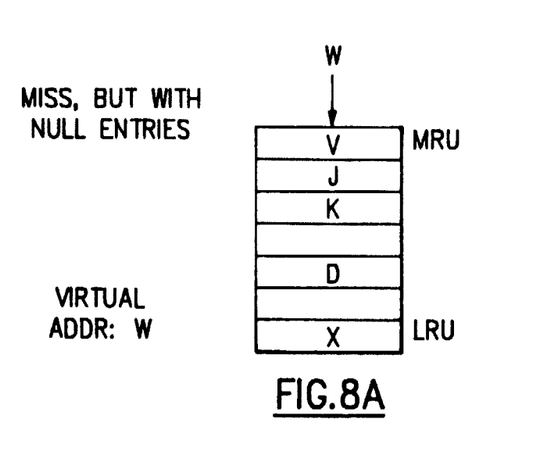
Figure 8B:
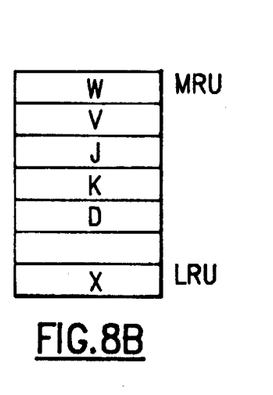

Referring to FIG. 6A, 6B, 7A, 7B, 8A and 8B there is illustrated operation of the system described above. FIG. 6A shows that when there is a hit for virtual address of V for example address V is removed from a lower rank or a lower order and becomes placed at the top as shown in FIG. 6B. The other addresses are shifted down so address V is removed from a position between D and Q. As shown in the operation in the FIGS. 7A and 7B if there is a "miss" to a virtual address W it is loaded on the top and X is shifted out at the bottom after shifting. As indicated in FIGS. 8A and 8B if there is a "miss" but with null entries the X entry is not pushed out but by means of the clear process tag clock and the lack of a load clock translation W is placed at the top of the stack and translations V through K are moved down so K is adjacent to translation D.

This system has several features. One feature is the ease in which to lay out simple logic for implementation of a LRU replacement strategy. The system allows three different ways to nullify translations. The first way is to reset all via the reset pulse. A second is to reset translations with particular process tag via the compare 25 and the input to AND gate 43 and RPTC. The third is to reset translations with particular process tag and virtual address. Unlike the prior art N-way associative map, the size of the buffer is not restricted to powers of 2. Additional buffers can be concatenated vertically and/or horizontally to form a larger buffer. Further, a defective buffer can be taken off the line at any point in the line. The type of structure provided herewith can be easily implemented with other functions in a single chip.

Figure 9:
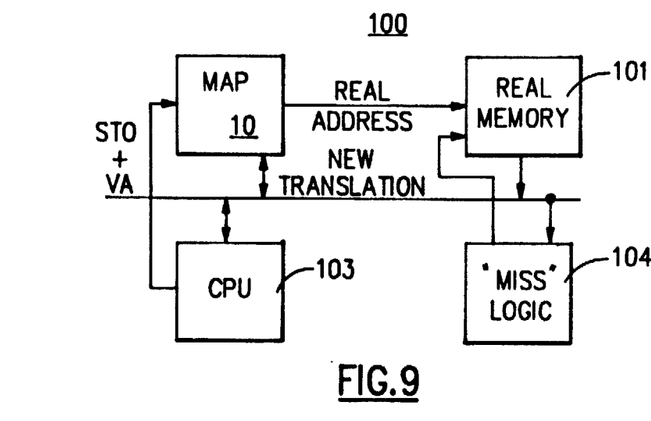
FIG. 9 is an overall block diagram of an associative map of FIG. 2 with a computer system.
Figure 10:
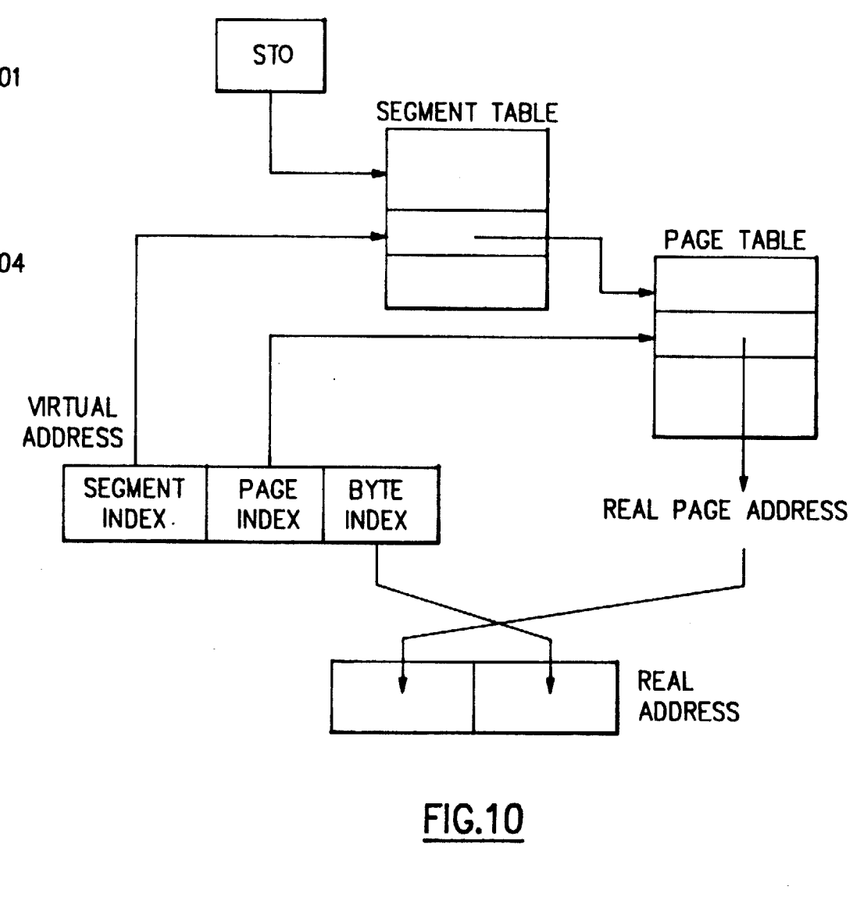
FIG. 10 is a diagram illustrative dynamic address translation from main memory.

Referring to FIG. 9 there is illustrated an overall computer system 10 using the associative map 10 of the present invention. The system 100 includes the associative map 10, a real memory 101, a processor 103 and the dynamic address translation (DAT) "miss" logic 104. The processor 103 sends the process tag and the virtual address to the map 10 and if there is a hit, the real address is applied to the main memory to make that data available for use by the processor 101. If there is a "miss" and consequently a requirement for a new translation, the DAT "miss" logic 104 sends the process tag for the proper segment table and sends a memory read to fetch from main memory 101 the segment table origin and based on segment index portion of the virtual address (see FIG. 10) gets from the memory 101 the page table origin. The DAT "miss" logic 104 combines the page table origin and the page index part of the virtual address to get the page table entry address. This page table entry address is sent to main memory 101 to fetch the real address for the new translation from memory. By operation of the map 10 as described above this virtual address plus the real memory translation is stored in the first storage device Entry$_0$.

What is claimed is:
1. A most recently used address translation system for translating a process tag and virtual memory addresses to a corresponding real memory address and for storing translation address sets of a process tag, a virtual address and a corresponding real address with least recently used replacement comprising:
an associative map including a plurality of storage devices, each storage device storing a group of said translation address sets of a process tag, a virtual memory address and a corresponding real memory address, said associative map providing a special process tag indicating a null entry (or set) in said storage device, means for providing a new translation address set of a process tag, a virtual address and a corresponding real address when said new translation address set is accessed and is not in said associative map, said plurality of storage devices arranged in a stack with a first storage device coupled to said providing means at an input end of said stack for receiving said new translation address set of a new process tag, a new virtual address and a corresponding new real memory address and said plurality of storage devices arranged in serial order and storing other translation address sets of a process tag, a virtual address and a corresponding real address in order of recent use such that the input of each of the plurality of storage devices except said first storage device is coupled to the output of said storage device that contains either said special process tag or a next more recently used translation address set of a process tag, a virtual address and a corresponding real address with a most recently used translation address set of a process tag, a virtual address and a corresponding real address at the first storage device and a least recently used translation address set of a process tag, a virtual address and a real addresses at said storage device at an opposite exit end furthest remote from said first storage device, and means coupled to said providing means and responsive to incoming process tags and virtual memory addresses for comparing said incoming process tag and virtual memory address with the process tags and the virtual memory addresses of the translation address sets stored in said plurality of storage devices for if there is not a match storing that translation address set of a process tag, a virtual memory address and a corresponding real memory address corresponding thereto in said first storage device and shifting any previously stored translation address sets of process tags, virtual and corresponding real memory addresses in said associative map from storage device to storage device and if said storage devices are full discarding the least recently used translation address set of a process tag, a virtual address and a corresponding real memory address at said opposite exit end and if there is a match at one of said storage devices providing that translation address set of process tag, virtual address and corresponding real memory address as an output from said system and putting that compared translation address set of process tag, virtual address and corresponding real address at said first storage device while removing said compared translation address set of process tag, virtual address and real memory address at said one of said storage devices and shifting down all other translation address sets of a process tag, a virtual address and a corresponding real address from said first storage device through said one of said storage devices.

2. The most recently used address translation system of claim 1 including means for detecting said special process tag to determine if there is a null entry in a storage device an when there is a new translation address set of a process tag, a virtual address and a corresponding real address to be stored in said first storage device shifting the translation address sets of a process tag, virtual address, and a corresponding real address down to and including the the storing device containing the null entry (set) to fill the null entry (set).

3. The most recently used address translation system of claim 2 wherein there is a comparator means at each storage device for comparing the incoming virtual addresses with those virtual addresses in the storage devices.

4. The most recently used address translation system of claim 3 wherein said storage devices include registers.

5. The most recently used address translation system of claim 3 including means coupled to each of said storage devices for clearing said storage devices and providing said special process tag thereto.

6. The most recently used address translation system of claim 5 including means for selectively clearing certain storage devices and providing at said certain storage devices said special process tag.

7. A computer system comprising:

a process providing, for memory access, a process tag and virtual memory address;

a main storage accessed by real memory addresses and said process tag, said main storage including storage of segment table origin, page table origin, and real addresses, said main storage coupled to said processor and responsive to said process tag and virtual address for, after several system cycles, providing a new translation address set of a new process tag, a new virtual address and a corresponding new real address via said segment table origin and a page table origin stored therein;

an associative map including a plurality of storage devices, each storage device storing a translation address sets of a process tag, a virtual memory address and a corresponding real memory address, said associative map providing a special process tag indicating a null entry (set) in the storage device, said plurality of storage devices arranged in a stack with a first storage device coupled to said main storage at an input end of said stack for receiving said new translation address set of a process tag, a virtual address and a corresponding new real memory address, said plurality of storage devices arranged in serial order and storing other translation address sets of a process tag, a virtual address and corresponding real address in order of recent use such that the input of each of the plurality of storage devices except said first storage device is coupled to the output of said storage device that contains either said special process tag or a next more recently used translation address set of a process tag, a virtual address and a corresponding real address with the most recently used translation address set of process tag, virtual address and corresponding real address at the first storage device and a least recently used translation address set of said process tag, virtual address and real address at said storage device at an opposite exit end furthest remote from said first storage device, and means coupled to said providing means and responsive to incoming process tags and virtual memory addresses for comparing said incoming virtual memory address with the process tag and virtual memory address of the translation address sets stored in said plurality of storage devices for if there is not a match coupling and storing that translation address set of process tag, virtual memory address and corresponding real memory address corresponding thereto in said first storage device and shifting previously stored translation address sets of process tag, virtual and real memory address from storage device to storage device and if said storage devices are full discarding the least recently used translation address set of process tag, virtual address and real memory address at said exit end, and, if there is a match at one of said storage devices providing that translation address set of process tag, virtual address and real memory address as an output from said system and putting that compared translation address set of process tag, virtual address and corresponding real address at said first device while removing said compared set of process tag, virtual address and real memory address at said one of said storage devices and shifting down all other translation address sets of process tag, virtual address and real address from said first storage device through said one of said storage devices.

8. The computer system of claim 7, including means for detecting null addresses for, if there is null entry in a storage device and there is a new translation address set, shifting translation address sets down to and including the storage device containing the null entry to fill the null entry.

9. The computer system of claim 8, wherein the means for comparing comprises a plurality of comparison means corresponding to the storage devices for comparing the incoming virtual addresses with those virtual addresses in the storage devices.

10. The computer system of claim 7, including means responsive to said process tag and virtual address for nullifying a corresponding translation address set and for, if there is a new translation, shifting the translation address sets down to and including the corresponding translation address set nullified.

* * * * *